Sept. 6, 1932.  W. F. BRETTSCHNEIDER  1,875,556
TRAFFIC SIGNAL
Filed Aug. 10, 1931  2 Sheets-Sheet 1

Inventor
William F. Brettschneider
By
Attorney

Sept. 6, 1932.  W. F. BRETTSCHNEIDER  1,875,556
TRAFFIC SIGNAL
Filed Aug. 10, 1931  2 Sheets-Sheet 2
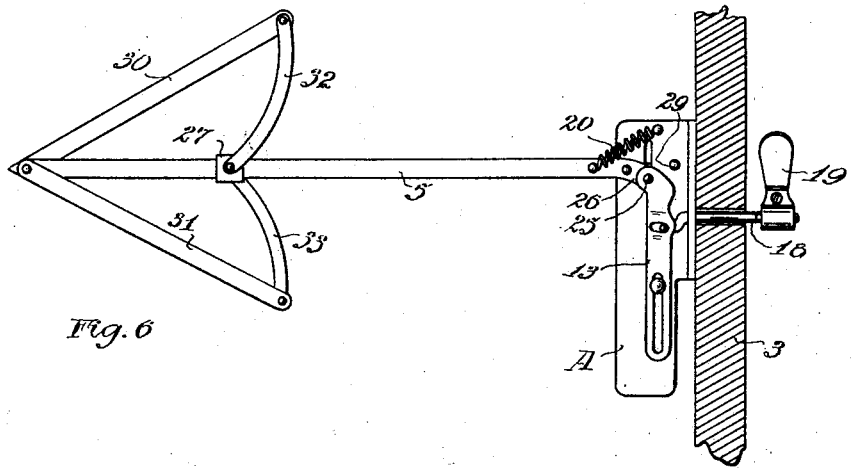
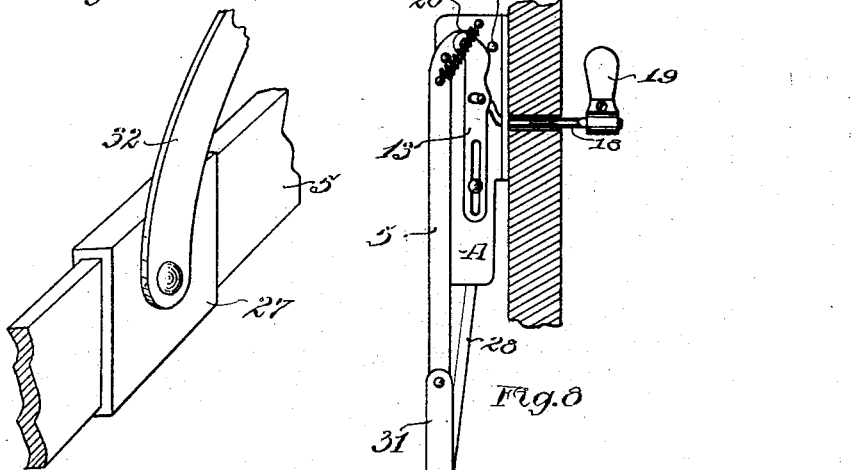
Inventor
William F. Brettschneider
By A. K. Johnson
Attorney Patented Sept. 6, 1932

1,875,556

UNITED STATES PATENT OFFICE

WILLIAM F. BRETTSCHNEIDER, OF ST. PAUL, MINNESOTA

TRAFFIC SIGNAL

Application filed August 10, 1931. Serial No. 556,042.

The present invention relates to an automobile traffic signal.

Various types of automobile traffic signals have been devised and a considerable amount of inventive effort has been expended in the attempt to devise a suitable turn signal. Many of these devices have been so complicated that their cost is prohibitive, while others have been found to be impractical for other reasons.

A driver of an automobile and also a pedestrian is accustomed to be on watch for the universally used arm signal of a driver contemplating a left turn, and for this reason a signal mounted to project from the side of the car at approximately the height of the driver's arm has been found to be the most suitable.

An object of the present invention is to make an improved and simplified left turn signal.

In order to attain this object, there is provided, in accordance with one feature of the invention, an arm mounted on the side of an automobile to swing in a vertical plane and operable from the interior of the car. A pair of vanes are pivotally connected to the outer end of this arm and are operatively connected to the arm operating mechanism to be folded into alinement with the arm when the arm is in an inoperative position and to be spread out at an acute angle to said arm when the arm is moved to an operative position.

These and other features of the invention will be more fully brought out in the following description and the accompanying drawings, wherein:

Figure 5 is an enlarged view in perspective of an operating handle.

Figure 6 is a view similar to Figure 2 showing a modified construction.

Figure 7 is a view similar to Figure 1 of the modified structure shown in Figure 6.

Figure 8 is a view similar to Figure 3 of the modified construction shown in Figures 6 and 7; and Figure 9 is an enlarged view in perspective of a slide member employed in the structure shown in Figures 6, 7, and 8.

Figure 1:
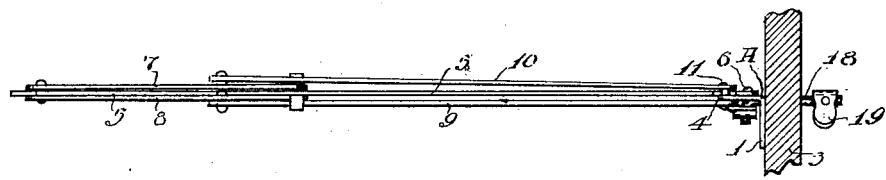
Figure 1 is a longitudinal, transverse, sectional view of a signal embodying the present invention, the signal being shown in operative position.

Referring to the drawings in detail, and considering first the structure shown in the first three figures of the drawings, a bracket A is formed of sheet metal having a base portion 1 with openings for screws 2 therein for attaching the device to an automobile frame member 3, and a perpendicularly disposed portion 4 for supporting the signal mechanism.

The signal mechanism comprises a metal strap member 5 pivotally secured as at 6 to the portion 4 of the bracket A. To the outer end of this strap member are pivotally connected two operating vane members 7 and 8. From each of these vanes links 9 and 10 are pivotally connected to a pivot member 11 which is offset horizontally from the pivot 6 which supports the main strap member 5. The link 9 has an angularly offset portion 12 to the end of which is pivotally connected a slide member 13. This slide member 13 is provided with an elongated slotted opening 14 which rides on a pin 15 fixedly secured to the bracket A. An upset portion 16 of the slide member 13 is provided with an opening 17 therein in which the end of an operating lever 18 is positioned. The shank of the operating lever 18 extends through the body member 3 of the car into the interior thereof and an operating handle 19 is fixedly secured to the inner end thereof. A spring 20 is connected to a pin 21 secured to the link 9, the other end of the spring 20 being connected to a pin 22 mounted on the bracket A.

Figure 2:
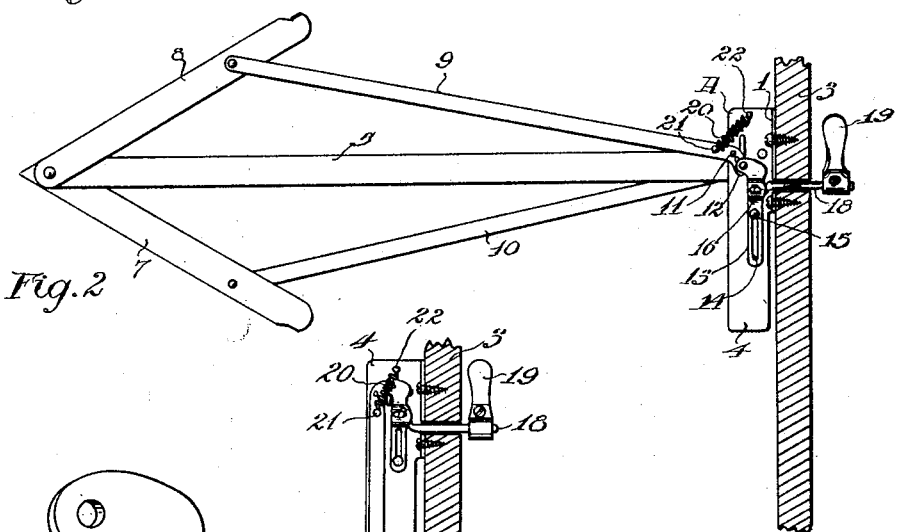
Figure 2 is a view in side elevation of the signal shown in Figure 1, a car body element being shown in section to disclose the method of mounting the signal.
Figures 3, 4:
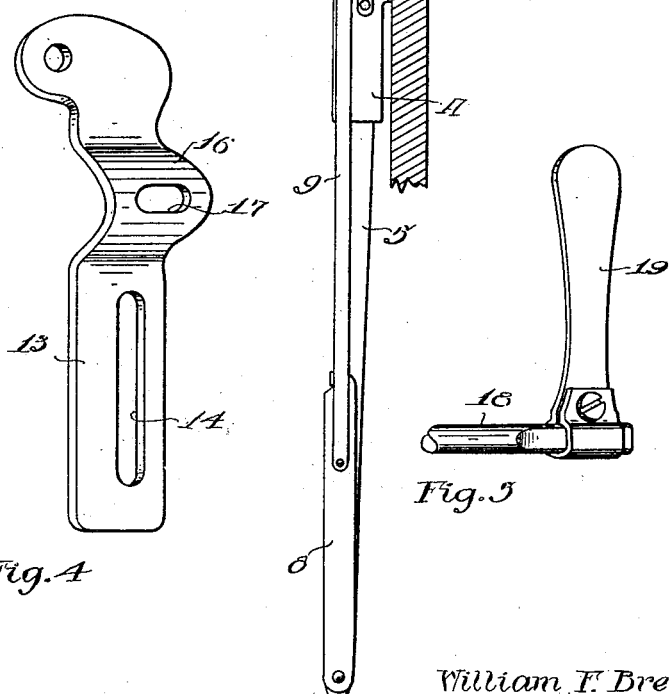
Figure 3 is a view similar to that in Figure 2 showing the signal in inoperative position.
Figure 4 is an enlarged view in perspective of a slidable operating member.

It will be noted from the Figures 2 and 3 that when the signal is in an operative position the spring tends to hold the signal in said operative position, and, in moving to an inoperative position the spring passes beyond dead center with respect to the pivot pin 11 which supports the link 9, and, when the signal is in inoperative position, as illustrated in Figure 3, the spring 20 tends to hold the signal in inoperative position.

A modified form of signal is shown in Figures 6 to 9, inclusive. In this structure the bracket A, the arm 5, operating handle 18, and spring 20 are similar to those illustrated in the first five figures of the drawings. In this construction, however, the main strap member 5 is mounted on a pivot 25 near the outer edge of the bracket and is provided with an angularly offset inner portion 26 to which the slide 13 is pivotally connected. A slidable sleeve 27 is mounted on the main strap member 5 and a link 28 is connected from this sleeve to a pivot 29 near the inner edge of the bracket. A pair of vanes 30 and 31 are pivotally connected to the outer end of the main strap member 5 and a pair of links 32 and 33 connect these vanes to the slide 27. In the operative position shown in Figure 6, the slide 27 is drawn inwardly on the strap member 5 to diverge the vanes and when moved to the inoperative position shown in Figure 8, the slide 27 is moved outwardly on the strap member 5 to draw the vanes inwardly toward the strap member 5.

The device comprises a simple, positive acting, and inexpensive turn signal which may be readily installed on any motor vehicle.

I claim:

1. An automobile turn signal, comprising in combination a supporting bracket, a signal member pivotally supported thereon, a pair of vanes pivotally connected to the outer end of said signal member, link means connected to said vanes and pivotally connected to said bracket, and an operating member slidably mounted on said bracket and pivotally connected to said link means to operate said signal.

2. An automobile turn signal, comprising a bracket adapted to be mounted on the side of an automobile, an operating member slidably mounted thereon, an operating handle pivotally mounted in said bracket, having connection with said slidable operating member to move said slidable member on an operation of said handle, a pivotally mounted signal arm mounted in said bracket to be pivotally movable in a transverse vertical plane with respect to a car upon which the device is mounted, a pair of vanes mounted adjacent the outer end of said arm, link means having eccentric pivotal connection with respect to the pivotal mounting of said arm to diverge said vanes on the moving of said arm to a horizontal position and to draw said vanes into substantial parallelism with said arm when said arm is moved to a vertical position, and means connecting said slidable member to said pivoted arm to operate said signal on a slidable movement of said slidable member.

In testimony whereof I affix my signature.

WILLIAM F. BRETTSCHNEIDER.